United States Patent [19]
Kiteley

[11] 3,883,779
[45] May 13, 1975

[54] FOUR-LEAD TUNING CAPACITOR FOR TELEVISION DEFLECTION SYSTEM

[75] Inventor: Terence J. Kiteley, Schaumburg, Ill.

[73] Assignee: Zenith Radio Corporation, Chicago, Ill.

[22] Filed: July 2, 1973

[21] Appl. No.: 375,585

[52] U.S. Cl. .......... 315/379
[51] Int. Cl. .......... H01j 29/70
[58] Field of Search .......... 315/20, 27 TD, 28, 29

[56] References Cited

UNITED STATES PATENTS

| | | | |
|---|---|---|---|
| 2,756,378 | 7/1956 | Scott | 315/20 |
| 3,015,752 | 1/1962 | Schrecongost | 315/20 |
| 3,588,608 | 6/1971 | Halinski et al. | 315/20 |
| 3,749,966 | 7/1973 | Ahrens et al. | 315/27 TD |
| 3,789,260 | 1/1974 | Ahrens | 315/27 TD |

*Primary Examiner*—Maynard R. Wilbur
*Assistant Examiner*—G. E. Montone
*Attorney, Agent, or Firm*—Nicholas A. Camasto

[57] ABSTRACT

A voltage-limited deflection transformer system includes a four-lead tuning capacitor. The foil electrodes of the capacitor each include connecting leads at opposite ends thereof. The electrodes are connected in a series circuit with the DC source, the transformer and the transformer driving circuit. An open circuit occurring in either foil electrode interrupts the DC to the transformer and disables it. A short circuit in the capacitor detunes the transformer and lowers its output voltage.

4 Claims, 6 Drawing Figures

FIG. 1
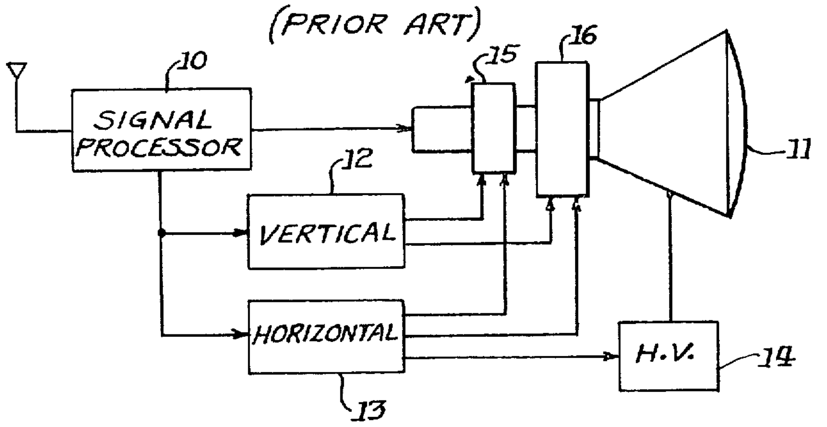
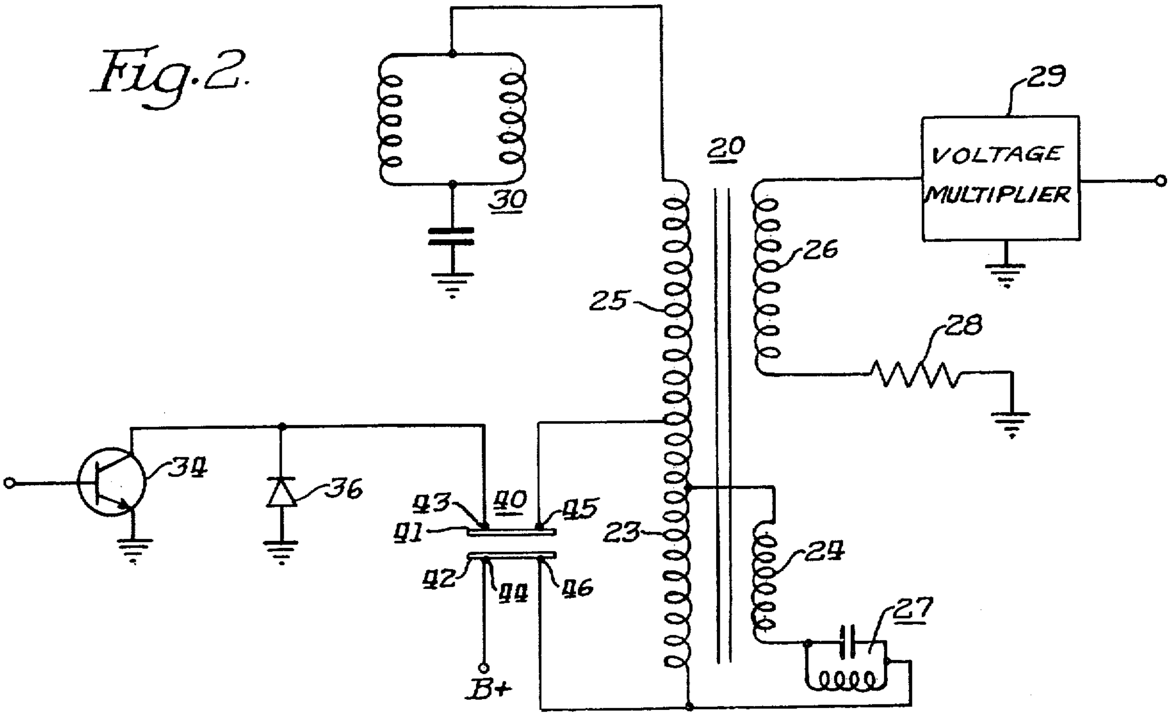
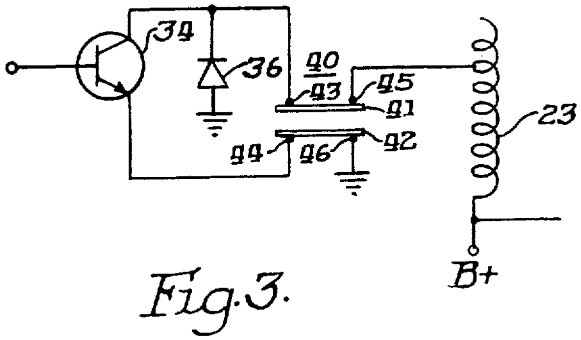

FOUR-LEAD TUNING CAPACITOR FOR TELEVISION DEFLECTION SYSTEM

CROSS-REFERENCE TO RELATED APPLICATION

This application is related to application Ser. No. 366,943, filed June 4, 1973, in the name of Hans E. Manske entitled "VOLTAGE-LIMITED DEFLECTION SYSTEM FOR A TELEVISION RECEIVER" and assigned to the assignee of the present invention.

BACKGROUND OF THE INVENTION

This invention relates generally to television receiver deflection and high voltage systems and particularly to a novel tuning capacitor for use therein to preclude excessive high voltage generation in the event of tuning capacitor failure. In recent years, considerable attention has been devoted to the thought-to-be-harmful X-radiation which may occur from the front of a television receiver as a result of high energy electron bombardment of the phosphor screen of the picture tube. While attention has also been directed to the high voltage rectification circuitry in television receivers, which also constitutes a potential source of X-radiation the advent of solid state rectification devices has eliminated that area of the receiver as a cause for concern. Monochrome receivers generally are not prone to radiation problems because of the lower high voltage which may be employed with monochrome picture tubes. However, as an example, a monochrome receiver with a 19 inch tube operating at 20,000 volts is not unusual. Such a receiver could present an X-radiation problem under fault conditions. Color television receivers operating under the fault conditions imposed by the U.S. Department of Health, Education and Welfare (HEW) may also present radiation problems.

It is well established that the vast majority of color television receivers of current design, when operating normally, do not exhibit excessive X-radiation. But, under abnormal operating conditions, such as those that may occur during failure modes of some of the receiver components, separate circuitry must be incorporated to preclude generation of excessive high voltage.

Recently, the HEW imposed standards upon television receiver manufacturers which, inter alia, required that the receiver not emit radiation in excess of prescribed levels, even though selected receiver components were placed in a failure mode. Since the source of high voltage in most color television receivers is a tuned horizontal sweep transformer (the output of which could increase substantially should an open circuit occur in the tuning capacitor associated therewith), it was necessary to incorporate relatively expensive and cumbersome prevention circuits to preclude excessive high voltage generation in the event of failure. The area of most concern centers about the transformer tuning capacitor. While such prevention circuits have proven quite effective, the present invention provides a high voltage limited sweep transformer system which includes a novel tuning capacitor, the failure of which will result in reducing the transformer output voltage. In the described embodiments, the tuning capacitor is constructed with four leads, one at the end of each foil electrode and the capacitor is connected such that B+ current flows over the foil electrodes.

In the above-referenced Manske application, the tuning capacitor is shown as an integral part of the sweep transformer windings. Interruption of the capacitor either completely disconnected the transformer or substantially reduced its energization. With the instant invention the tuning capacitor is separate and includes four leads which are connected to produce a high voltage limited transformer system.

OBJECTS OF THE INVENTION

A primary object of this invention is to provide an improved television receiver.

Another object of this invention is to provide a novel high voltage limited television receiver.

SUMMARY OF THE INVENTION

In accordance with this invention, a horizontal sweep transformer system is connected to a B+ source over the electrodes of a separate four-lead tuning capacitor. An open circuit failure of the capacitor results in interruption of B+ to the transformer and total loss of voltage output therefrom. A short circuit failure of the capacitor results in detuning the transformer in a direction such that the output voltage therefrom decreases. One embodiment of the novel capacitor discloses four external leads and a multiplicity of internal connection points along the length of the foil electrodes. A capacitor constructed in this manner has a very distant advantage of being readily manufactured on existing equipment with minimum change in present capacitor manufacturing techniques.

BRIEF DESCRIPTION OF THE DRAWINGS

FIG. 1 is a block diagram of a prior art television receiver;

FIG. 2 is a schematic diagram of a high voltage limited horizontal sweep transformer circuit constructed in accordance with the invention;

FIG. 3 is an alternative arrangement of a portion of the circuit shown in FIG. 2;

DESCRIPTION OF THE PREFERRED EMBODIMENT

Figure 4:
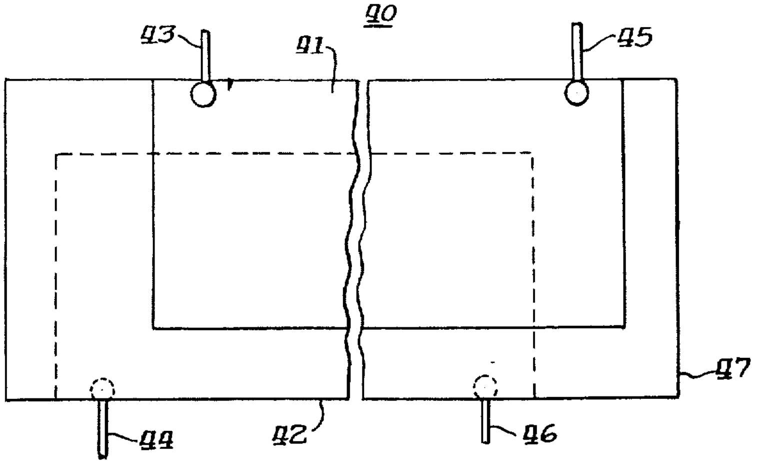
FIG. 4 is a schematic representation of a four-lead capacitor constructed in accordance with the invention.

Referring to FIG. 1, there is shown a block diagram of a television receiver comprising a signal processor 10 for receiving and translating broadcast television signals and supplying both the luminance and chrominance information contained therein to a color cathode ray tube 11. Signal processor 10 supplies a vertical circuit 12 and a horizontal circuit 13 which in turn provide appopriate vertical and horizontal deflection signals to a convergence yoke 15 and a deflection yoke 16. Another output of horizontal circuit 13 supplies a high voltage circuit 14 which is connected to and supplies the ultor or second anode electrode of picture tube 11. The television circuit of FIG. 1 and the functioning of its various components are well-known in the art and need no detailed description. The vertical and horizontal circuits supply appropriately shaped currents to deflection yoke 16 for establishing the vertical and horizontal deflection fields needed to scan the electron beams over the phosphor screen of picture tube 11. Currents for adjusting the deflection signal waveforms in accordance with electron beam location for performing beam convergence correction are also supplied.

While high voltage circuit 14 may be conventional, it preferably comprises a solid state voltage multiplier circuit for effectively multiplying the peak voltage produced by the horizontal transformer. The multiplication circuitry simplifies transformer construction and readily lends itself to the use of the present invention because, as will be seen, the lower voltages encountered in the transformer relax the insulation requirements on the tuning capacitor.

FIG. 2 is a schematic diagram of the horizontal sweep transformer circuitry in horizontal circuit 13 showing a novel tuning capacitor 40 having foil electrodes 41 and 42. The circuitry, with the exception of the portion relating to the tuning capacitor, is generally typical of that in current use. However, components for ancillary circuit functions, such as boost voltage generation, are not shown for clarity. A horizontal deflection transformer 20 comprises a magnetically permeable core having a primary winding 23, a secondary winding 25 (connected in autotransformer fashion), a tertiary or high voltage winding 26 and a link winding 24. A source of B+ is connected to a terminal 44 on foil electrode 42 of capacitor 40. A separate terminal 46 on foil electrode 42 connects to primary winding 23, which in turn, is connected to a terminal 45 on foil electrode 41. Finally, a terminal 43 on foil electrode 41 connects to the collector of a horizontal output transistor 34, the base of which is supplied with an appropriate oscillatory signal from means (not shown). The emitter of transistor 34 is connected to ground. Thus, it will be seen that the energizing circuit for the transformer and output transistor include, in series, the B+ source, foil electrode 42, transformer primary winding 23, foil electrode 41, and the emitter-collector circuit of transistor 34. It will be appreciated that other circuit arrangements may be used in place of the one illustrated for driving transformer 20, the major criterion being that tuning capacitor 40 be part of the circuit for tuning transformer 20.

A damper diode 36 is connected across the collector of transistor 34. Diode 36, transistor 34 and transformer 20 cooperate in a well-known manner to generate, from the oscillatory signal input, an increasing current of relatively long duration in yoke horizontal circuit 30 during trace periods, corresponding to occurrence of picture information, and relatively short duration pulses of high amplitude during the retrace periods when the electron beams in the picture tube are returned to their starting positions. Secondary winding 25 feeds the yoke horizontal circuit 30 which, it will be understood, forms a part of deflection yoke 16 mounted on the picture tube. A corresponding yoke vertical circuit (not shown) will also be understood to be included in deflection yoke 16.

A tertiary winding 26 provides a high voltage output for application to a voltage multiplier 29. Tertiary winding 26 is returned to ground through a current limiting resistor 28 for preventing excessive currents being drawn by the voltage multiplier in the event of fault currents created for example by fortuitous internal flashovers in the picture tube. Multiplier 29 preferably is a voltage "tripler" and includes a plurality of diodes and capacitors interconnected in series-parallel fashion for producing approximately three times the peak voltage developed by tertiary winding 26 of transformer 20.

Transformer 20 is conventional and in accordance with common usage has its tertiary tuned to a frequency different from the one to which its primary is tuned. The reasons therefor are beyond the scope of this disclosure, but suffice it to say that a properly wave-shaped high voltage pulse is desirable and tuning of the tertiary to an odd harmonic of the retrace pulse ringing frequency (the reciprocal of the retrace pulse period) assists in obtaining that objective. Thus, the primary winding is generally tuned to resonate at the horizontal retrace pulse time of 12.5 $\mu$ second, whereas the tertiary winding is tuned to an odd multiple of the retrace pulse ringing frequency. In practice, the fifth harmonic is utilized. This is accomplished by loosely coupling the tertiary winding to the primary winding (by physically separating the windings on opposite legs of the transformer core) and separately tuning the tertiary. In order to facilitate energy transfer from the primary winding to the tertiary winding, a link winding 24 is added which "links" both the primary and the tertiary windings. Link winding 24 is electrically in parallel with part of the primary winding and is wound under the tertiary winding. An external inductance-capacitance network 27 is tuned to anti-resonance at either the third or the seventh harmonic of the retrace pulse ringing frequency to prevent undesirable intercoupling between the primary winding and the tertiary winding at selected frequencies.

In operation, a 15,750 Hz oscillatory signal input to transistor 34 develops (in conjunction with damper diode 36 and tuned transformer 20) an output voltage having trace and retrace portions as described above. The retrace portions are characterized by a short duration high amplitude pulse, which are also used to drive the voltage multiplier circuitry. The DC flowing through the transformer and transistor traverses foils 42 and 41 of capacitor 40. Consequently, a fault in either foil electrode will disable the circuit and prevent excessive high voltage generation. Similarly, a short circuit condition in the foils disables the transformer, or in the case of a high impedance fault, sufficiently changes the capacitance of capacitor 40 to detune the circuit, which results in lowering of transformer output voltage. In any case, the generation of excessive high voltage in the event of a fault condition occurring in the tuning capacitor is precluded.

FIG. 3 shows an alternative arrangement of the circuit of FIG. 2 (with certain simplifications) wherein the interconnection of the foil electrodes of capacitor 40 are different. Primary winding 23 has one end connected to B+ and the other end connected to terminal 45 of foil electrode 41 of capacitor 40. The other terminal 43 of foil electrode 41 is connected to the junction of the collector of transistor 34 and the cathode of damper diode 36. The emitter of transistor 34 is connected to terminal 44 of foil electrode 42 of the capacitor and the remaining terminal 46 is connected to ground. Thus, both foil electrodes 41 and 42 are connected in a series electrical circuit including B+, primary winding 23 and the emitter-collector circuit of transistor 34. The remaining portion of the circuit of FIG. 2 (not shown in FIG. 3) is the same. The circuit operation is unchanged and again a fault in capacitor 40 results in reduced output voltage from the transformer.

In FIG. 4, an idealized representation of a four-lead capacitor is shown. As indicated by the broken lines, the true dimensions of the parts are not illustrated. Capacitor 40 includes a generally rectangular shaped conductive foil electrode 41 at opposite ends of which are electrically and mechanically affixed connectors 43 and 45. A similarly shaped conductive foil electrode 42 is positioned in underlying and offset relationship to foil 41 and includes connectors 44 and 46 at its extremities. A sheet of dielectric insulating material 47 is interposed between foils 41 and 42 and completes the capacitor. Normally, an additional layer of insulating material (not shown) is placed over foil 41 and the entire arrangement rolled or folded into a compact configuration. Other insulating layers may be employed, depending upon the dielectric constant needed and operating voltage considerations. The value of the capacitance is, of course, a function of the foil area and dielectric material used. The foil length is many times greater than its width in order to attain the large surface areas required for normal capacitance values. The finished capacitor is generally impregnated with a silicone based insulating compound and encapsulated in a hermetically sealed insulating container.

Figure 5:
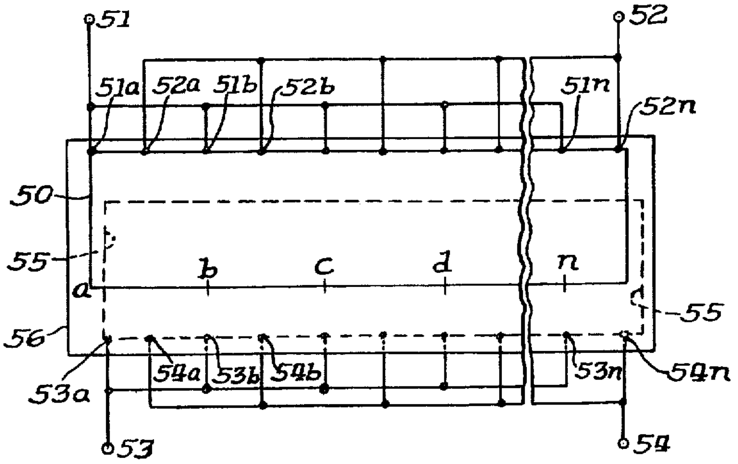
FIG. 5 is a pictorial showing of a four-lead capacitor which is readily manufacturable on existing equipment.

FIG. 5 is a schematic representation of a four-lead capacitor illustrating the approximate electrical connections resulting when using the alternate construction method mentioned above. As in FIG. 4, foils 50 and 55 are separated by a dielectric layer 56 and may include further insulating material (not shown). The series of designations *a*, *b*, *c* . . . *n* signify points lying on a selected radius of the "jelly roll" configuration resulting from rolling the foil and insulation sheets into a cylinder. Thus, *a* indicates the "start" or inside terminus of the foils; *b*, the first overlapping layer; *c*, the second overlapping layer . . . and *n*, the nth overlapping layer. Connection points are shown at each described point on foil 50 and are labelled 51*a*, 51*b* . . . 51*n*. These connection points are connected to a terminal lead 51. Similarly, a series of connection points 52*a*, 52*b* . . . 52*n* are connected to a terminal lead 52. The latter connection points are illustrated as occurring at the diametrically opposed portions of the assumed cylinder arrangement, i.e., midway between points *a*, *b*, *c*, etc. Foil 55 underlies foil 50 and dielectric sheet 56 and is shown in dotted lines. It is illustrated with a similar set of connection points 53*a*, 53*b* . . . 53*n* connected to terminal lead 53 and 54*a*, 54*b* . . . 54*n* connected to terminal lead 54. The schematic illustration of specific connection points will be understood to include arrangements including many more connection points along the foil length as well as those including fewer connection points. As will be made clear below, the criterion is that at least small areas of foil be maintained between the "51" and "52" connection points and between the "53" and "54" connection points. It will be seen that electrically this foil construction is comparable with that illustrated in FIG. 4. Consequently, the functioning of a four-lead capacitor, constructed in this manner, in the circuit arrangements illustrated would be substantially the same. For example, in the event of a short circuit between capacitor foils, the result would be detuning of the sweep transformer and reduction in voltage output therefrom. In the unlikely event of a break (open circuit) occurring in a foil, the capacitor will function normally because of the bridging connections which maintain the same electrode area. For example, a break in foil 50 between connection points 51*b* and 52*b* doesn't change the capacitance or interrupt the foil electrical circuit because of the remaining bridging connections such as 51*a* and 51*c*. Consequently, there is no change in capacitance and in reality, no capacitor failure in the sense that a circuit behavioral change can be recognized. If a break occurs in the main connections between terminals 51 and 52 of a four-lead capacitor constructed in accordance with FIG. 5, the result will be an open B+ circuit. Hence, the FIG. 5 capacitor has the same "failure proof" qualities in the sweep system as that demonstrated by the FIG. 4 capacitor. The advantage is that the FIG. 5 capacitor is readily manufactured with existing manufacturing techniques and equipment and is consequently extremely attractive economically, whereas, the manufacture of FIG. 4 type four-lead capacitor as illustrated in FIG. 4 is more difficult with existing equipment and techniques.

Figure 6:
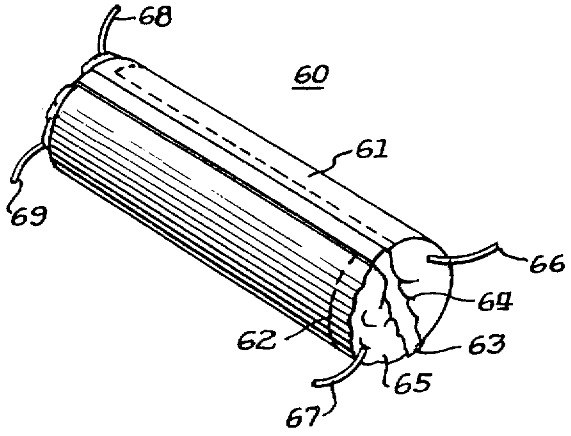
FIG. 6 is a perspective view of an actual four-lead capacitor schematically shown in FIG. 5.

In manufacturing a conventional two-lead capacitor with foil electrodes, the interleaved sheets of foil and insulating material is rolled to form a cylinder (and physically appears substantially as shown in FIG. 6). The foil is of a metal which is receptive to solder and after rolling, each end of the cylinder is dipped into molten solder. The solder does not adhere to the insulating material but does adhere to the edge of the foil, effectively forming a great plurality of electrical bonding points therewith. Under ideal conditions, the electrical bonding is continuous along the foil length. Since the foils are staggered in their relationship, each is closer to one end of the cylinder than the other and, by controlling the depth to which the combination is dipped into solder, the end of only one foil is soldered. The result is two electrically isolated, interleaved foil electrodes forming a capacitor. The resulting solder "globs" on the cylinder ends have leads affixed thereto and the arrangement is encapsulated in a hermetically sealed insulating case.

FIG. 6 represents a readily manufacturable four-lead capacitor 60 with foil interconnections similar to those illustrated in FIG. 5. The manufacturing operation may proceed as described above to the point of soldering the ends of the cylinder. Prior to soldering, a longitudinal band of insulating material 63 is tightly wrapped around the foil and insulating material cylinder. The band compresses the extending insulating material at the cylinder ends, forming a solder barrier under the band. The band splits the resulting solder glob into two globs 64 and 65, providing isolation between one half of foil 61 on the end of the cylinder from the other half of foil 61 and enables two terminal lead points. To repeat, during exposure to solder, solder glob 64, connected to half of the end of foil 61, is electrically isolated from solder glob 65 connected to the other half of this same foil end. Leads 66 and 67 are connected to solder globs 64 and 65, respectively. An identical connection situation exists at the other end of the cylinder where leads 68 and 69 are connected to isolated solder globs (not shown). If the unit were unrolled, an arrangement similar to that shown in FIG. 5 would be seen to exist.

While this particular capacitor construction is not part of the present invention, it represents the actual commercial version capacitor of the invention and is included for the purposes of making a complete disclosure of the inventive system and method. It also serves to underscore the fact that the particular construction details of the four-lead capacitor may be varied considerably from the illustrated embodiments.

What has been described is a tuned sweep high voltage system for a television receiver and novel four-lead capacitor therefor which is failure proof with respect to faults occurring in the tuning capacitor.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. A television receiver including: a picture tube and associated deflection apparatus, said tube requiring a high DC potential; a tuned sweep transformer and a tuning capacitor supplying appropriate currents to said deflection apparatus; high voltage amplifying and rectifying means for producing said high DC potential from the output of said tuned sweep transformer, said transformer having an output voltage generating capability, in the event of failure occurring in said tuning capacitor, which is in excess of a predetermined safe level; and a source of B+ potential; said tuning capacitor including a pair of insulated foil electrodes, at least one of said foil electrodes being DC connected in the current path between said source of B+ potential and said transformer whereby in the event of failure of said capacitor, the voltage generated by said sweep transformer decreases.

2. A television receiver as set forth in claim 1, further including a transistor connected in driving relationship with said transformer and wherein said transformer includes a primary winding; said foil electrodes being connected in a series circuit including said source of B+, said primary winding and said transistor.

3. A television receiver as set forth in claim 2, wherein said one foil electrode is connected between said source of B+ and one end of said primary winding and the other of said foil electrodes is connected between said other end of said primary winding and said transistor.

4. A television receiver as set forth in claim 2, wherein said one foil electrode is connected in a series circuit extending from said source of B+ to one terminal of said transistor through said primary winding and the other of said foil electrodes is connected from another terminal of said transistor to ground.

* * * * *